US 6,661,465 B2

(12) United States Patent
Zhu et al.

(10) Patent No.: US 6,661,465 B2
(45) Date of Patent: Dec. 9, 2003

(54) TELEVISION INTERFACE FOR HANDHELD CALCULATOR FOR USE WITH MULTIPLE CALCULATOR DISPLAY FORMATS

(75) Inventors: Xiaoming Zhu, Coppell, TX (US); Robert R. Ahlfinger, Waxahachie, TX (US)

(73) Assignee: Texas Instruments Incorporated, Dallas, TX (US)

(*) Notice: Subject to any disclaimer, the term of this patent is extended or adjusted under 35 U.S.C. 154(b) by 422 days.

(21) Appl. No.: 09/835,801

(22) Filed: Apr. 16, 2001

(65) Prior Publication Data

US 2001/0035914 A1 Nov. 1, 2001

Related U.S. Application Data

(60) Provisional application No. 60/198,784, filed on Apr. 20, 2000.

(51) Int. Cl.[7] .................................................. H04N 7/01
(52) U.S. Cl. .................. 348/552; 348/563; 345/2.1; 345/2.2; 345/169
(58) Field of Search ................................. 348/552, 553, 348/563, 567, 441, 445, 555, 556, 558; 345/2.1, 2.2, 2.3, 169, 3.1, 3.2, 440.1, 440; 708/105, 109, 130, 139

(56) References Cited

U.S. PATENT DOCUMENTS

| 4,151,596 | A | * | 4/1979 | Howells | 708/141 |
|---|---|---|---|---|---|
| 4,236,152 | A | * | 11/1980 | Masuzawa et al. | 345/440.1 |
| 4,259,668 | A | * | 3/1981 | Nishimura et al. | 345/169 |
| 4,396,941 | A | * | 8/1983 | Nishimura et al. | 348/552 |
| 4,475,164 | A | * | 10/1984 | Sado | 708/109 |
| 4,639,225 | A | * | 1/1987 | Washizuka | 434/308 |
| 5,633,923 | A | * | 5/1997 | Kovarik | 379/267 |
| 5,798,759 | A | * | 8/1998 | Dahl | 345/745 |
| 5,818,425 | A | * | 10/1998 | Want et al. | 345/158 |
| 6,072,521 | A | * | 6/2000 | Harrison et al. | 725/81 |
| 6,195,068 | B1 | * | 2/2001 | Suzuki et al. | 345/2.2 |
| 6,580,422 | B1 | * | 6/2003 | Reilly | 345/169 |

OTHER PUBLICATIONS

Texas Instruments News Release—"Texas Instruments Introduces TI–92 Plus, the Latest Unit in the Flash Memory Family, and Graphing Calculator Accessories,"—(TI–Presenter:), National Council of Teachers of Mathematics (NCTM) Conference, Apr. 22, 1999, pp. 1–3, San Francisco, CA.

* cited by examiner

Primary Examiner—Michael H. Lee
Assistant Examiner—Jean W. Désir
(74) Attorney, Agent, or Firm—Bret J. Petersen; W. James Brady, III; Frederick J. Telecky, Jr.

(57) ABSTRACT

An interface (10) for connecting a calculator (12) to a standard television (11), so that the calculator's display can be re-displayed on the television (1). The interface (10) is useful with different calculators having different display formats. Reformatting of the input signal is accomplished by dividing format detection and reformatting tasks between a field programmable gate array (21) and a microprocessor (23).

20 Claims, 3 Drawing Sheets

TELEVISION INTERFACE FOR HANDHELD CALCULATOR FOR USE WITH MULTIPLE CALCULATOR DISPLAY FORMATS

This application claims priority under 35 USC §119(e)(1) of provisional application No. 60/198,784 filed Apr. 20, 2000.

TECHNICAL FIELD OF THE INVENTION

This invention relates to handheld calculators, and more particularly to an interface for reformatting calculator display signals so that they are suitable for display on a television.

BACKGROUND OF THE INVENTION

Electronic calculators have become an essential tool for everyone. Consumers have a wide choice of calculator types and models.

Many persons own relatively inexpensive scientific calculators with one or two line displays, but recently more and more persons are discovering the advantages of "big-screen" calculators characterized by a two-dimensional display screen capable of displaying graphs and other graphical images. These calculators are often called "graphing calculators" because the popularity of these calculators for use in teaching various types of graphs and plots.

Calculators with these larger display screens are especially popular for educational applications. When these calculators are used in a classroom, it is often desired to duplicate the calculator display on an even larger screen suitable for viewing by an entire room full of students. The conventional approach is to use an overhead projector for such displays.

SUMMARY OF THE INVENTION

One aspect of the invention is an interface that receives display data input from a calculator and outputs a video signal, for use by a video device such as a television. A programmable logic device, such as an FPGA, receives the display data from the calculator, and delivers at least a portion of the data to a processor for use in determining the type of display format used by the calculator. The processor makes this determination and responds with data to the logic device to determine the processing to be performed by the logic device. The logic device might be comprised of different units for processing different formats, or it might be reprogrammed for each new type of format. In the former case, the appropriate unit is selected; in the latter case, the logic device is reprogrammed.

The logic device is further operable to perform hard logic processing of the display data, and the processor is further operable to receive partially processed display data from the logic device and to perform software processing of the display data. The division of tasks between hard logic processing and software processing is determined at least in part by the type of display format, and the "processing" performed by the logic device may be as simple as routing and/or buffering tasks.

As an example of task division between the logic device and the processor, for pixel type input data, the logic device can be used to multiplex the data and to provide appropriate control signals. On the other hand, for command type input data, the logic device might simply re-route the commands to the processor, or it might assist the processor by partially interpreting the commands. After processing, the processor outputs data having a format suitable for display by the video device.

In other embodiments, the logic device rather than the processor could be used to identify the type of display format used by the calculator.

An advantage of the interface is that it is useful with different types of calculators having different display formats. In the past, a different interface was required for each type of format. The invention provides a universal and upgradable interface that solves this problem. It is also designed to accommodate future calculators having new types of display formats.

DETAILED DESCRIPTION OF THE INVENTION

Figure 1:
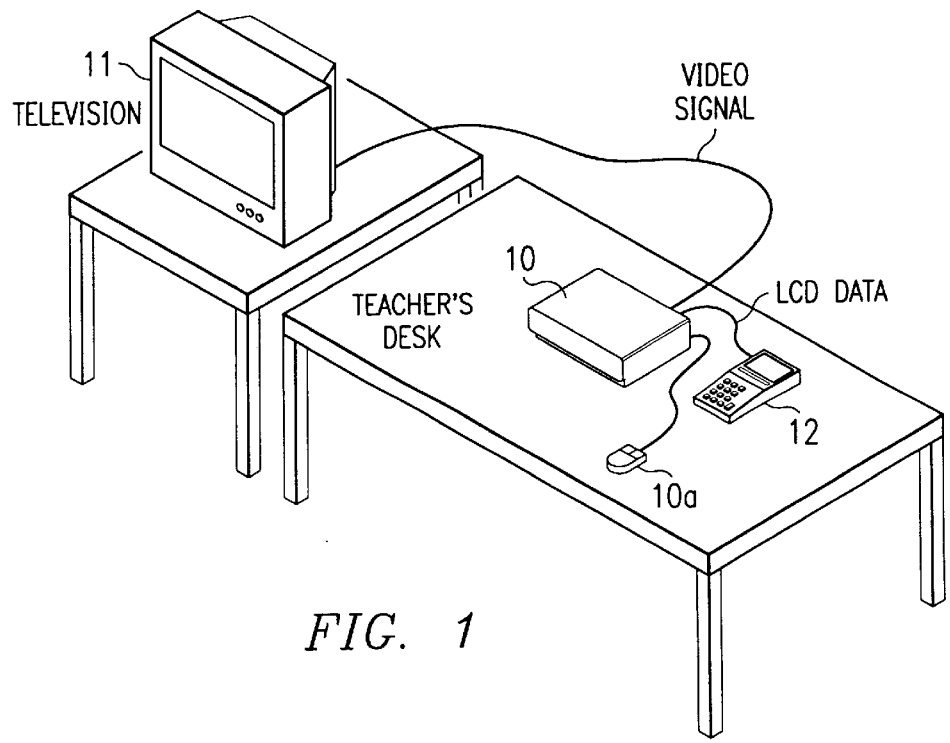
FIG. 1 is a block diagram of a graphing calculator connected to a television, using an interface in accordance with the invention.

FIG. 1 illustrates how an interface 10 in accordance with the invention may be used to re-display a calculator screen on a television 11. As explained below, interface 10 permits displays from calculator 12 to be re-displayed or recorded in real time.

In the example application of FIG. 1, the television 11 is used in a classroom to display the screen of a calculator 12. Interface 10 is operated by a teacher and is located on the teacher's desk.

Television 11 is a conventional television, configured to receive scan-type television signals, such as NTSC or PAL signals. In other embodiments, television 11 could be another type of video display or recording device, such as a VCR, video camera, or video projector with composite video input. These devices are referred to collectively herein as "video devices".

Calculator 12 may be any calculator having a two-dimensional screen display. As discussed in the Background, this type of calculator has become synonymous with "graphing calculators". A feature of the invention is that interface 10 is not limited to a calculator 12 having a particular display format; it is easily configurable for operation with different types of calculators with different display formats.

A typical calculator 12 has an LCD (liquid crystal display) screen of 64×96 pixels. It also has a processor, memory, keypad, and various I/O interfaces. In addition to the ability to draw graphical displays of various types, typical software features of calculator 12 are the capability for stacked fractions, constant features, English and metric conversions, data loading and storage, and keystroke programming. A user interface displays various menus, prompts, and error messages to the user, as well as receives commands, functions, and settings from the user.

It is assumed that calculator 12 has a display connector for delivering LCD data to interface 10. Examples of calculators with which interface 10 may be used are the following calculators, all manufactured by Texas Instruments Incorporated: TI-73, TI-82, TI-83, TI-85, TI-86, TI-89, and TI-92, each equipped with a display connector, such as the ViewScreen connector also manufactured by Texas Instruments Incorporated.

Interface 10 receives LCD data from calculator 12. It delivers a video signal to television 11 via a standard composite video connection. The connection to television 11 may be via a VCR or an RF modulator. A special SCART adapter may be used for televisions in Europe that have an SCART video-in port. In response to the video signal from interface 10, television 11 generates a display that is a duplicate of the display on calculator 12.

In some embodiments, interface 10 may be programmed to add additional content to the calculator display. For example, graphic user interface objects, such as pointers, menus, and buttons, may be added. A mouse (hand operated input device) 10a may be used to navigate and enter commands.

In the embodiment of FIG. 1, interface 10 may be powered by AC household current, using a power cord connected to a wall outlet. In other embodiments, interface 10 could be battery operated.

Figure 2:
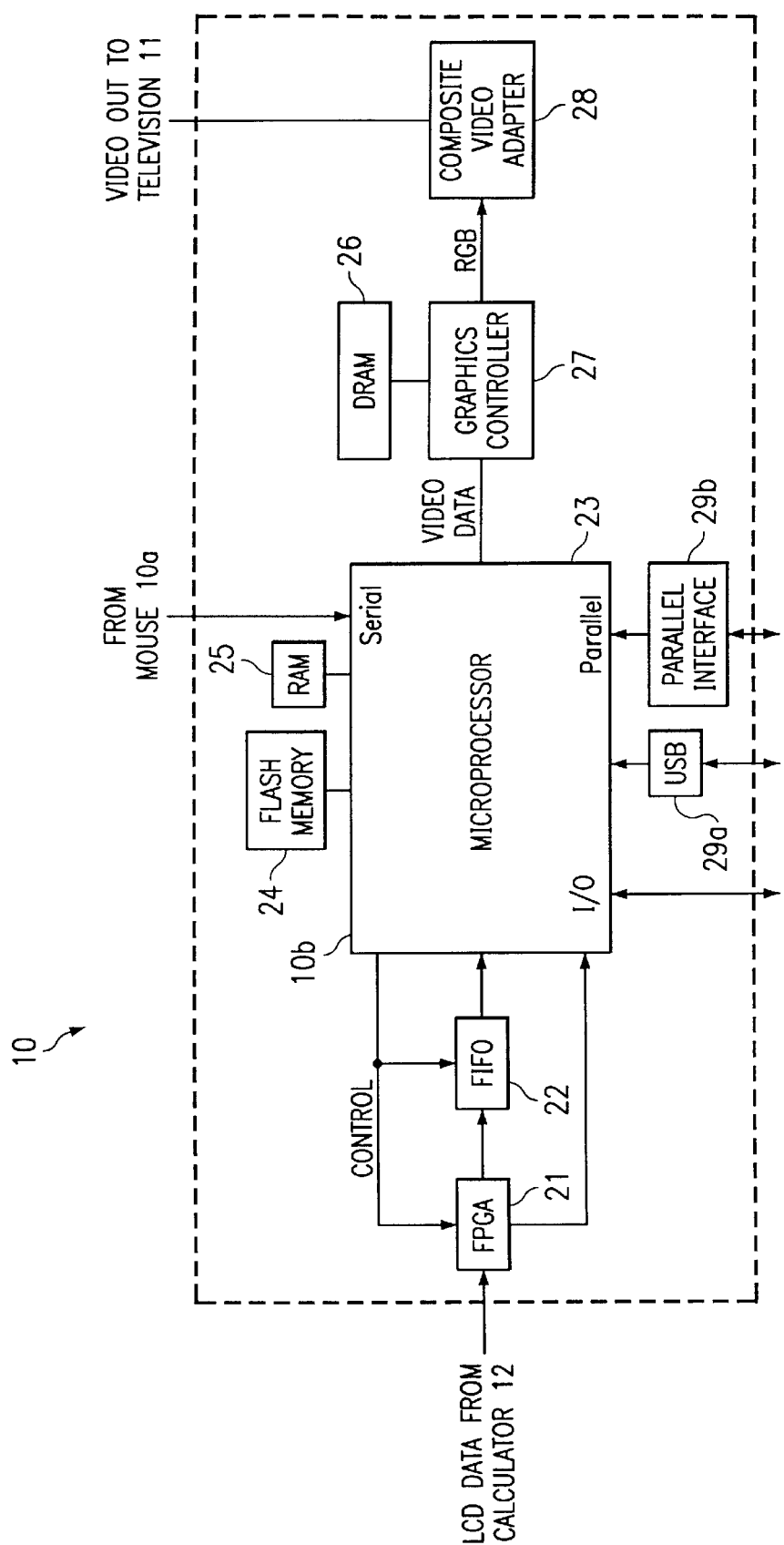
FIG. 2 is a block diagram of the interface of FIG. 1.

FIG. 2 is a block diagram of one embodiment of the internal components of interface 10.

FPGA (field programmable gate array) 21 receives LCD data from calculator 10. As explained below, for a given type of LCD data received by interface 10, the tasks involved in reformatting the signal for display on television 11 are divided between FPGA 21 and processor 23. Other devices equivalent to FPGA 21 could be used, with a common characteristic being the ability to either reconfigure or reprogram the device to perform "hard wired" formatting tasks for a given type of calculator display. In the former case, a different portion of a pre-programmed device might be used. In the latter case, the device may be reprogrammed for a new type of LCD data input signal. A more general term for such devices is "programmable logic device".

FIFO 22 buffers data to permit real time processing to be accomplished with a relatively low speed processor 23. As an alternative to FIFO 22, FPGA 21 might have sufficient circuitry to accomplish buffering.

Processor 23 executes programming to reformat the incoming LCD data to a video format. The portions of its programming that it executes for any one type of calculator 12 may vary from that executed for a different calculator having a different display format. As stated above, processor 23 may be programmed to perform tasks in addition to reformatting that is the subject of this invention, such as the addition of additional content to the display. However, for purposes of this description, only those tasks important to reformatting are discussed herein. Processor 23 may be implemented with any general purpose microprocessor, with an example of a suitable device being a 16-bit microprocessor.

Flash memory 24 is a flash PROM memory device, which may receive new programming for interface 10. In this manner, software repairs and upgrades may be easily made to FPGA 21 or to processor 23. RAM 25 stores additional programming for processor 23. In other embodiments, the programming for FPGA 21 and processor 23 could be downloaded to, or permanently stored in, other types of memory devices.

Graphics controller 27 converts the data from processor 23 to a standard RGB signal. An example of a suitable graphics controller 27 is one that provides a signal in accordance with the SVGA standard.

Composite video adapter 28 converts the RGB signal into a composite video signal. As stated above, typically the video signal will be in either the NTSC or PAL format.

The use of both graphics controller 27 and video adapter 28 assumes a television 11 that is configured to receive NTSC or PAL analog video signals. In other embodiments, a different television 11, such as one using an HDTV standard, might use one or more different adapters to convert the output of processor 23 to a form useable by the television. In general, the function of adapters such as graphics controller 27 and video adapter 28 is to provide synchronization signals and any digital-to-analog conversion.

USB port 29a and parallel port 29b permit interface 10 to communicate with other processor-based equipment, such as a personal computer. A serial port provides input from mouse 10a. An I/O port permits programming to be loaded to memory of interface 10.

Figure 3:
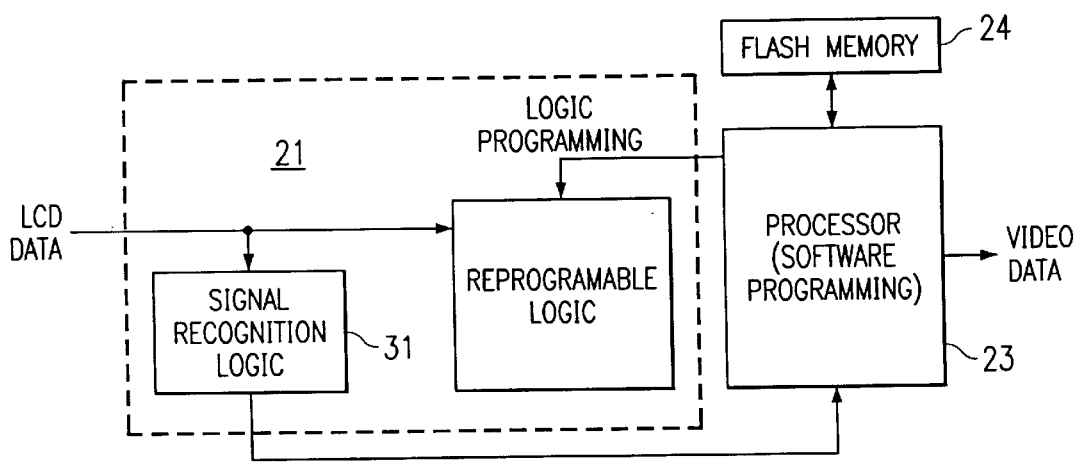
FIG. 3 is a functional block diagram of the processing elements of FIG. 2.

FIG. 3 is a functional block diagram of FPGA 21 and processor 23. As explained below, "hard logic" processing tasks are performed by FPGA 21, whereas "software" processing tasks are performed by processor 23. The delineation of which tasks are considered "hard logic" tasks and which are considered "software" tasks varies, depending on the type of input signal.

In operation, interface 10 automatically detects the display format of the particular calculator 12 connected to it. Specifically, in the example of FIG. 3, FPGA 21 has signal recognition logic 31 that receives the LCD data and determines its type. It then delivers a signal to processor 23, indicating the signal type. Processor 23 then accesses flash memory 24, and delivers the appropriate programming for that display format to FPGA 21. FPGA 21 is now configured with the proper circuitry for processing that format type. As explained below, in other embodiments, processor 23 might perform the signal recognition or FPGA 21 might be configured by selecting a pre-programmed portion of its circuitry.

As an example of format detection, the incoming LCD data might come in on a multi-pin connection, of which a subset of pins can be used to recognize the display type. The signal recognition logic 31 might have sufficient circuitry to receive and analyze these pins only.

In other embodiments, the signal recognition logic 31 might merely route an appropriate portion of the LCD data to processor 23. In this case, the actual signal detection would be performed by processor 23.

Once the signal type is detected, the display dimensions, frame rate, and other characteristics of the incoming display signal are known. For a given format, processing tasks are divided between FPGA 21 and processor 23. In general, the division of tasks between FPGA 21 and processor 23 is such that FPGA 21 performs one of three levels of a "task pyramid": routing, routing and buffer control, or routing and buffer control as well as some interpretation.

Task partitioning between FPGA 21 and processor 23 is based on the type of signal. For example, interface 10 may receive either "pixel" LCD data or "command" LCD data.

An LCD data input signal that is of the "pixel" type comprises a stream of pixel data bits, perhaps in parallel with additional control data. A set number of bits, say 4 bits, represents pixel data. A calculator using this format would have a "dumb" driver, which simply places the image on the screen.

Figure 4:
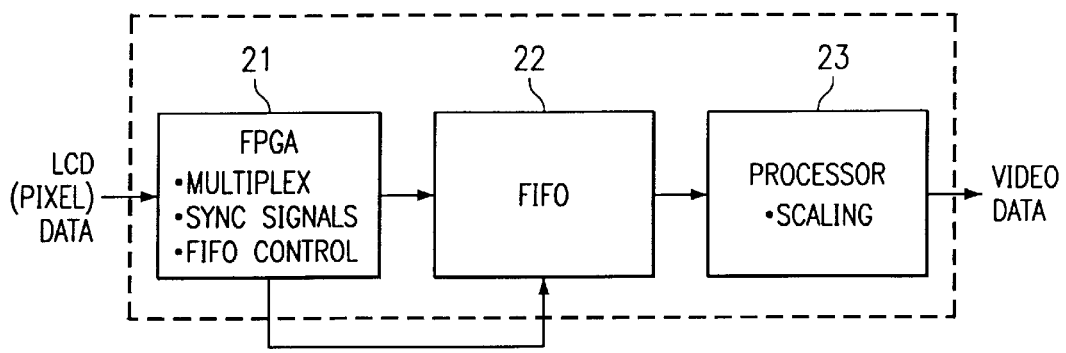
FIG. 4 illustrates division of processing tasks for pixel type input display data.

As illustrated by the example of FIG. 4, for pixel type input data, FPGA 21 is used to provide synchronization signals. For example, the incoming data may have a frame rate different from that to be provided by processor 23. The synchronization signal would permit the processor 23 to synchronize frames.

An LCD data input signal that is the "command" type comprises display commands that are to be interpreted for generating the display. A calculator using this format has a processor-based "smart" driver that interprets the commands to generate the image. An advantage of command type display format is that the display need not be continually refreshed.

Figure 5:
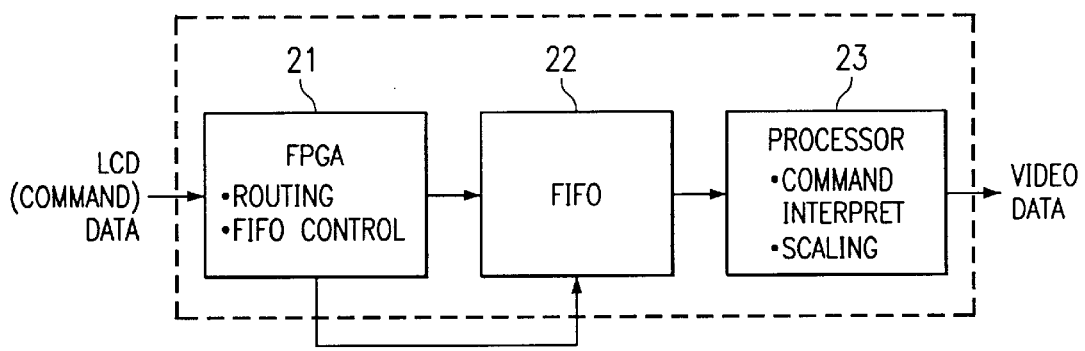
FIG. 5 illustrates division of processing tasks for command type input display data.
Figure 6:
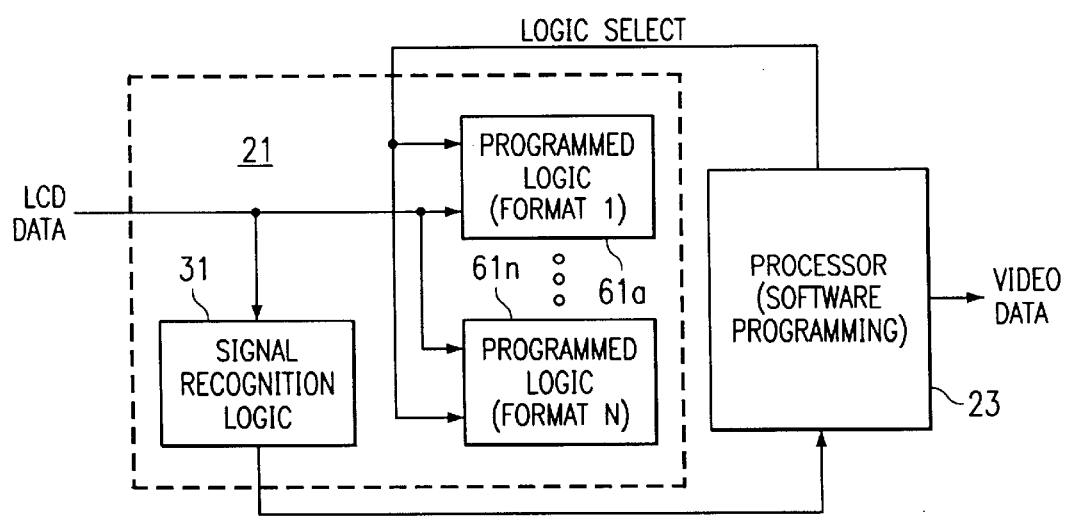
FIG. 6 is an alternative embodiment of the processing elements, with the logic device having pre-programmed units for different display formats.

As illustrated in FIG. 5, for command type input data, one example of task partitioning is to program FPGA 21 to simply route the data to processor 23. Processor 23 would then be programmed to emulate the smart driver of the calculator by interpreting the commands. Thus, in this approach, the display data formatting is an emulation that is primarily performed with processor software rather than by FPGA hardware.

Task partitioning between FPGA 21 and processor 23 might also be based on the processing speed of processor 24. The display standard of television 11 (i.e., NTSC or PAL) dictates a certain output data rate. FPGA 21 can be used to assist processor 23 in providing a sufficient data rate. In the case of pixel type input data, FPGA 21 might be used to multiplex two 4-bit data words to 8-bit data words. In the case of the command type input data, FPGA 21 could be used to perform some of the command interpretation tasks.

For both pixel type and command type input data, FPGA 21 is used to provide buffer control signals for FIFO 22. The timing of these control signals depends on the format type.

The output of processor 23 is a pixel representation of the calculator display in a format suitable for display in television 11. In general, this means pixel data having the correct resolution and color information. For example, processor 23 may be required to perform scaling or interpolation tasks to provide a greater number of pixel rows and pixels per row. This data is stored in DRAM 26 for access by whatever adapter(s) are to be used.

FIG. 4 illustrates an alternative embodiment of the invention. In comparison to the embodiment of FIG. 3, where FPGA 21 is re-programmed "on the fly", in FIG. 4 different parts of FPGA are programmed for different display formats. A first unit 41a processes Format 1, with additional units for Formats 2, 3, . . . N. Once the format type is detected, processor 23 delivers a control signal to selection logic 42, which directs the LCD data to the proper unit 41a–41n.

Other Embodiments

Although the present invention has been described in detail, it should be understood that various changes, substitutions, and alterations can be made hereto without departing from the spirit and scope of the invention as defined by the appended claims.

What is claimed is:

1. An interface that receives display data input from a calculator and outputs video data, comprising:
   a programmable logic device that receives the display data from the calculator, determines the type of display format used by the calculator, and outputs a format identifier signal indicating the type of display format; and
   a processor that receives the format identifier signal from the logic device and responds with a control signal to the logic device to determine the processing to be performed by the logic device;
   memory for storing programming for the processor;
   wherein the logic device is further operable to perform hard logic processing of the display data and the processor is further operable to receive partially processed display data from the logic device and to perform software processing of the display data, with the division of tasks between hard logic processing and software processing determined at least in part by the type of display format; and
   wherein the processor is further operable to output video data representing a display on the calculator and having a format suitable for display by a video device.

2. The interface of claim 1, wherein the logic device is a field programmable gate array.

3. The interface of claim 1, wherein the logic device has different units for processing different display types and wherein the control signal selects one of said units.

4. The interface of claim 1, wherein the logic device is reprogrammable and the control signal reprograms the logic device for a current display format.

5. The interface of claim 1, further comprising flash memory in data communication with the processor for providing new programming for the logic device.

6. The interface of claim 1, wherein the processing performed by the logic device is at least routing of the display data to the processor.

7. The interface of claim 1, wherein the processing performed by the logic device is at least buffering of the display data.

8. An interface that receives display data input from a calculator and outputs video data, comprising:
   a programmable logic device that receives the display data from the calculator and separates a portion of the display data for use in determining the type of display format used by the calculator;
   a processor that uses the portion of the display data to determine the type of display format and delivers a control signal to the logic device that determines the processing to be performed by the logic device;
   memory for storing programming for the processor;
   wherein the logic device is further operable to perform hard logic processing of the display data and the processor is further operable to receive partially processed display data from the logic device and to perform software processing of the display data, with the division of tasks between hard logic processing and software processing determined at least in part by the type of display format; and
   wherein the processor is further operable to output video data representing a display on the calculator and having a format suitable for display by a video device.

9. The interface of claim 8, wherein the logic device is a field programmable gate array.

10. The interface of claim 8, wherein the logic device has different units for processing different display types and wherein the control signal selects one of said units.

11. The interface of claim 8, wherein the logic device is reprogrammable and the control signal reprograms the logic device for a current display format.

12. The interface of claim 8, further comprising flash memory in data communication with the processor for providing new programming for the logic device.

13. The interface of claim 8, wherein the processing performed by the logic device is at least routing of the display data to the processor.

14. The interface of claim 8, wherein the processing performed by the logic device is at least buffering of the display data.

15. A method of reformatting a display data signal from a calculator for a video device, comprising the steps of:

using a programmable logic device to receive the display data signal and deliver a portion of the signal to a processor;

using a processor to identify the signal format and to deliver a control signal to the logic device that determines the processing to be performed by the logic device;

using the logic device to perform hard logic reformatting, wherein the hard logic reformatting includes at least routing the display data to the processor; and using the processor to perform software reformatting, such that it outputs data in a format suitable for the video device;

wherein the division of tasks between the hard logic reformatting and software reformatting is determined at least in part by the type of display format.

16. The method of claim 15, wherein the division of tasks is further determined by the processing speed of the processor.

17. The method of claim 15, wherein the software reformatting includes at least interpretation of command type display data.

18. A method of reformatting a display data signal from a calculator for a video device, comprising the steps of:

using a programmable logic device to receive the display data signal, identify the signal format type, and deliver a format identifier signal to a processor;

using a processor to deliver a control signal to the logic device that determines the processing to be performed by the logic device;

using the logic device to perform hard logic reformatting, wherein the hard logic reformatting includes at least routing the display data to the processor; and using the processor to perform software reformatting, such that it outputs data in a format suitable for the video device;

wherein the division of tasks between the hard logic reformatting and software reformatting is determined at least in part by the type of display format.

19. The method of claim 18, wherein the division of tasks is further determined by the processing speed of the processor.

20. The method of claim 18, wherein the software reformatting includes at least interpretation of command type display data.

* * * * *